Feb. 6, 1934.   A. S. VAN HALTEREN   1,945,793
WHEEL HUB ASSEMBLY
Original Filed Feb. 26, 1931
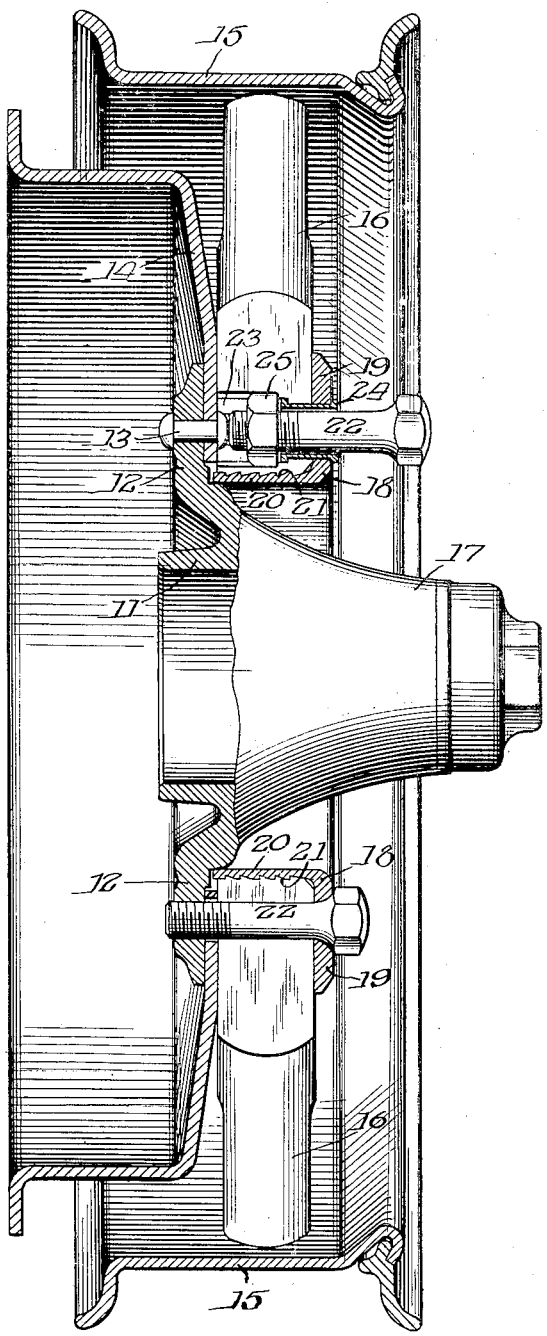
Witness:
R. B. Davison.
Inventor:
Andrew S. Van Halteren
By Cromwell, Greist & Warden
Attys Patented Feb. 6, 1934

1,945,793

UNITED STATES PATENT OFFICE 1,945,793

WHEEL HUB ASSEMBLY

Andrew S. Van Halteren, East Lansing, Mich., assignor to Motor Wheel Corporation, Lansing, Mich., a corporation of Michigan Original application February 26, 1931, Serial No. 518,306. Divided and this application September 19, 1932. Serial No. 633,771

3 Claims. (Cl. 301—9)

The present invention has to do with means for assuring the integrity of the wheel elements when disassembled from the hub, and is to subject matter divided out of my copending application Serial No. 518,306, filed February 26, 1931.

It is necessary in connection with spoke wheels, particularly those of wood, to provide means for holding the spokes against disassociation when the wheel is removed from the hub. It is common to provide about the central opening of the wheel body a metal liner of channel section, the two legs of which embrace the sides of the spider and the base of which forms an abutment for the inner ends of the spokes. An object of the present invention is to effect an equivalent binding together of the spider elements with a decrease in weight and manufacturing expense of the channeled liner by doing away with one of the radial legs of the same.

In order that the invention may be readily understood one preferred embodiment of the same is illustrated in the accompanying drawing and set forth in the following description predicated thereon.

Referring to the drawing by way of illustration only, there is shown a hub 11 provided with the usual hub flange 12 to which flange is riveted at 13 a brake drum 14. Upon the hub flange 12 is mounted a wheel body comprising the rim 15 and the spoke elements 16. About the central opening for the accommodation of the hub barrel 17 is arranged an annular liner 18 of L-section, one leg 19 of which lies against the forward face of the spoke spider made up of the elements 16, while the other leg 20 of the liner forms an inner abutment for the spoke ends. The leg 20 of the liner, for a purpose more fully to be explained, has its outer contact face formed with forwardly inclined serrations or teeth 21.

The leg 19 of the liner and the spoke spider are provided with an annular series of bolt holes adapted to receive cap screws 22 or other forms of bolts which extend into threaded engagement with the hub flange, whereby the wheel body is mounted upon or demounted from the hub. These cap screws 22 for removable clamping of the wheel to the hub flange preferably alternate with the rivets 13 for permanently securing the brake drum to the hub flange, although it is to be understood that in some cases the brake drum and rivets might be omitted or the brake drum applied to the opposite side of the hub flange without in any way affecting the present invention inasmuch as the hub flange forms the rear carrying support and attaching medium for the wheel body.

At some point intermediate the holes in the spoke spider for the cap screws 22 there is provided a hole 23 which extends through the wheel spider from its front to the front face of the rear support, which hole may have its forward portion lined by a thimble 24. Driven into this hole 23 from the rear is a nut 25, the corners of which are forced into engagement with the wood to prevent turning therein and further movement towards the front prevented by the reduced section of the hole here shown as provided with the thimble 24. This nut has an interior thread corresponding to that of the cap screws 22. The features described immediately above form no part of the present invention, being claimed in the parent application, Serial No. 518,306.

Where the liner 18 about the central wheel opening is of channel section, with a leg lying both in front of and at the rear of the spoke ends, the integrity of the spider is not impaired by removing the cap screws 22 used to assemble the wheel body with the hub, but where for purposes of lightness and economy one of the legs of the channel is omitted, substitute means of some sort must be employed to prevent the spokes from shifting laterally out of the embrace of the liner. Many expedients have been resorted to for this purpose, all of which possess some disadvantage.

According to my invention I provide the outer face of the inner liner leg 20 with the serrations or teeth inclined towards the front leg 19. When the liner annulus is forced into the central opening of the spider from the front, these serrations bite into the ends of the wood spokes and the interengagement prevents any reverse movement of the liner out of the spider or of individual spokes away from the liner.

It is also a known fact in wood wheel manufacture that the miters of the spokes settle after the wheel has been placed in use and the butt ends of the spokes pattern into the hub. The contact between the spoke end and the hub or liner is found to be much tighter after use than at the time of assembly. This provision of serrations on the liner further takes advantage of this condition, as they bite deeper into the spoke ends under conditions of use.

While the frictional engagement of the wood spoke ends with the metal serrations on the liner precludes accidental disassembly by reason of rough handling, yet where it becomes necessary to replace a damaged spoke or spokes lateral force designedly applied will unseat said spokes without deforming the liner as would be the case were the latter of channeled or flared section.

I claim:

1. In a wheel, a hub having a radial flange, a demountable wheel body including a wood spoke spider with a central opening to accommodate the hub, a liner about the opening comprising an annular plate of substantially L-section with one leg overlying the front face of the spokes and the other leg forming an inner abutment for the spoke ends, the latter leg having on its contact face forwardly inclined serrations engaging the spoke ends, and means to clamp the liner and wood spoke spider to the hub flange.

2. In a wheel, a wheel body including a spoke spider with a central opening to accommodate the hub, a liner for the opening comprising a flanged cylindrical member of substantially L-section with the flange overlying the side face of the spokes in the hub zone and the cylindrical portion forming an inner abutment for the spoke ends, the outer face of the liner roughened to engage the spoke ends and interlock the liner and spokes against lateral displacement.

3. In a wheel, a wheel body including a spoke spider with a central opening to accommodate the hub, a liner for the opening comprising a flanged cylindrical member of substantially L-section with the flange overlying the side face of the spokes in the hub zone and the cylindrical portion forming an inner abutment for the spoke ends, the outer face of the liner provided with serrations inclined towards the flange to form an interlocked engagement with the spoke ends to prevent lateral displacement.

ANDREW S. VAN HALTEREN.